US007960027B2

(12) United States Patent
Guiheen et al.

(10) Patent No.: US 7,960,027 B2
(45) Date of Patent: Jun. 14, 2011

(54) TRANSPARENT CONDUCTORS AND METHODS FOR FABRICATING TRANSPARENT CONDUCTORS

(75) Inventors: James V. Guiheen, Madison, NJ (US); Yubing Wang, Piscataway, NJ (US); Peter A. Smith, South Amboy, NJ (US); Kwok Wai Lem, Randolph, NJ (US)

(73) Assignee: Honeywell International Inc., Morristown, NJ (US)

( * ) Notice: Subject to any disclaimer, the term of this patent is extended or adjusted under 35 U.S.C. 154(b) by 701 days.

(21) Appl. No.: 12/020,849

(22) Filed: Jan. 28, 2008

(65) Prior Publication Data

US 2009/0189124 A1 Jul. 30, 2009

(51) Int. Cl.
*B32B 27/40* (2006.01)
*B32B 15/04* (2006.01)
*H01B 1/02* (2006.01)
*C08K 5/00* (2006.01)

(52) U.S. Cl. .................. 428/423.1; 428/457; 252/518.1; 524/284; 524/507

(58) Field of Classification Search ............... 428/423.1, 428/457; 252/500, 518.1; 524/284, 507
See application file for complete search history.

(56) References Cited

U.S. PATENT DOCUMENTS

| | | | |
|---|---|---|---|
| 3,635,870 | A | 1/1972 | Thoma et al. |
| 3,828,218 | A | 8/1974 | Fehnel |
| 4,658,958 | A | 4/1987 | McNulty et al. |
| 5,080,963 | A | 1/1992 | Tatatchuk et al. |
| 5,101,139 | A | 3/1992 | Lechter |
| 5,102,745 | A | 4/1992 | Tarachuck et al. |
| 5,265,273 | A | 11/1993 | Goodwin et al. |
| 5,571,165 | A | 11/1996 | Ferrari |
| 5,576,162 | A | 11/1996 | Papadopoulos |
| 5,578,543 | A | 11/1996 | Tennent et al. |
| 5,614,584 | A | 3/1997 | Schwan et al. |
| 5,707,916 | A | 1/1998 | Snyder et al. |
| 5,752,914 | A | 5/1998 | Delonzor et al. |
| 5,853,877 | A | 12/1998 | Shibuta |
| 5,877,110 | A | 3/1999 | Snyder et al. |
| 6,017,610 | A | 1/2000 | Abe et al. |
| 6,066,448 | A | 5/2000 | Wohlstadter et al. |
| 6,084,007 | A | 7/2000 | Narukawa et al. |
| 6,184,280 | B1 | 2/2001 | Shibuta |
| 6,235,674 | B1 | 5/2001 | Tennent et al. |

(Continued)

FOREIGN PATENT DOCUMENTS

EP 0908920 A2 4/1999

(Continued)

OTHER PUBLICATIONS

Parekh, B. et al., "Improved conductivity of transparent singlewall carbon nanotube thin films via stable postdeposition functionalization", Applied Physics Letters 90 (12): pp. 1-3 (2007).

(Continued)

*Primary Examiner* — Thao T. Tran
(74) *Attorney, Agent, or Firm* — Ingrassia Fisher & Lorenz, P. C.

(57) ABSTRACT

Transparent conductors and methods for fabricating transparent conductors are provided. In one exemplary embodiment, a transparent conductor comprises a substrate having a surface and a transparent conductive coating disposed on the surface of the substrate. The transparent conductive coating has a plurality of conductive components of at least one type and an aliphatic isocyanate-based polyurethane component.

11 Claims, 3 Drawing Sheets

U.S. PATENT DOCUMENTS

| | | | | |
|---|---|---|---|---|
| 6,331,265 | B1 | 12/2001 | Dupire et al. | |
| 6,630,772 | B1 | 10/2003 | Bower et al. | |
| 6,650,679 | B1 | 11/2003 | Bragin et al. | |
| 6,752,977 | B2 | 6/2004 | Smalley et al. | |
| 6,785,036 | B1 | 8/2004 | Berneth et al. | |
| 6,790,526 | B2 | 9/2004 | Vargo et al. | |
| 6,908,572 | B1 | 6/2005 | Derbyshire et al. | |
| 6,939,525 | B2 | 9/2005 | Colbert et al. | |
| 6,969,504 | B2 | 11/2005 | Smalley et al. | |
| 6,988,925 | B2 | 1/2006 | Arthur et al. | |
| 7,048,903 | B2 | 5/2006 | Colbert et al. | |
| 7,052,666 | B2 | 5/2006 | Colbert et al. | |
| 7,060,241 | B2 | 6/2006 | Glatkowski | |
| 7,070,754 | B2 | 7/2006 | Smalley et al. | |
| 7,105,596 | B2 | 9/2006 | Smalley et al. | |
| 7,115,864 | B2 | 10/2006 | Colbert et al. | |
| 7,118,693 | B2 | 10/2006 | Glatkowski | |
| 7,119,479 | B2 | 10/2006 | Hori et al. | |
| 7,195,780 | B2 | 3/2007 | Dennis et al. | |
| 7,727,578 | B2 * | 6/2010 | Guiheen et al. | 427/58 |
| 2002/0046872 | A1 | 4/2002 | Smalley et al. | |
| 2002/0048632 | A1 | 4/2002 | Smalley et al. | |
| 2002/0068170 | A1 | 6/2002 | Smalley et al. | |
| 2002/0084410 | A1 | 7/2002 | Colbert et al. | |
| 2002/0150524 | A1 | 10/2002 | Smalley et al. | |
| 2003/0066960 | A1 | 4/2003 | Colbert et al. | |
| 2003/0122111 | A1 | 7/2003 | Glatkowski | |
| 2003/0158323 | A1 | 8/2003 | Connell et al. | |
| 2004/0067329 | A1 | 4/2004 | Okuyama | |
| 2004/0099438 | A1 | 5/2004 | Arthur et al. | |
| 2004/0116034 | A1 | 6/2004 | Den et al. | |
| 2004/0160183 | A1 | 8/2004 | Kim | |
| 2004/0186220 | A1 | 9/2004 | Smalley et al. | |
| 2004/0197546 | A1 | 10/2004 | Rinzler | |
| 2004/0265550 | A1 | 12/2004 | Glatkowski et al. | |
| 2005/0074565 | A1 | 4/2005 | Cok | |
| 2005/0084622 | A1 * | 4/2005 | Houghtaling et al. | 428/1.1 |
| 2005/0133779 | A1 | 6/2005 | Choi et al. | |
| 2005/0156318 | A1 | 7/2005 | Douglas | |
| 2005/0173706 | A1 | 8/2005 | Sasa et al. | |
| 2005/0191493 | A1 | 9/2005 | Glatkowski | |
| 2005/0195354 | A1 | 9/2005 | Doane et al. | |
| 2005/0196707 | A1 | 9/2005 | Cok | |
| 2005/0209392 | A1 | 9/2005 | Luo et al. | |
| 2005/0221016 | A1 | 10/2005 | Glatkowski et al. | |
| 2005/0230560 | A1 | 10/2005 | Glatkowski et al. | |
| 2005/0232844 | A1 | 10/2005 | Diner | |
| 2005/0236603 | A1 | 10/2005 | Faris | |
| 2005/0266162 | A1 | 12/2005 | Luo et al. | |
| 2006/0003152 | A1 | 1/2006 | Youngs | |
| 2006/0008597 | A1 | 1/2006 | Zagdoun | |
| 2006/0054868 | A1 | 3/2006 | Dai | |
| 2006/0057290 | A1 | 3/2006 | Glatkowski | |
| 2006/0060825 | A1 | 3/2006 | Glatkowski | |
| 2006/0062983 | A1 | 3/2006 | Irvin et al. | |
| 2006/0065075 | A1 | 3/2006 | Chang et al. | |
| 2006/0065902 | A1 | 3/2006 | Todori et al. | |
| 2006/0067602 | A1 | 3/2006 | Todori et al. | |
| 2006/0068025 | A1 | 3/2006 | Chang et al. | |
| 2006/0078705 | A1 | 4/2006 | Glatkowski et al. | |
| 2006/0111008 | A1 | 5/2006 | Arthur et al. | |
| 2006/0113510 | A1 | 6/2006 | Luo et al. | |
| 2006/0188721 | A1 | 8/2006 | Irvin et al. | |
| 2006/0188723 | A1 | 8/2006 | Rowley et al. | |
| 2006/0257638 | A1 | 11/2006 | Glatkowski et al. | |
| 2006/0274047 | A1 | 12/2006 | Spath et al. | |
| 2006/0274048 | A1 | 12/2006 | Spath et al. | |
| 2006/0274049 | A1 | 12/2006 | Spath et al. | |
| 2007/0036978 | A1 | 2/2007 | Chen | |
| 2007/0043158 | A1 | 2/2007 | Smalley et al. | |
| 2007/0065651 | A1 | 3/2007 | Glatkowski et al. | |
| 2007/0065977 | A1 | 3/2007 | Rinzler | |
| 2007/0074316 | A1 | 3/2007 | Alden et al. | |
| 2007/0116916 | A1 | 5/2007 | Ito et al. | |
| 2007/0120095 | A1 | 5/2007 | Gruner | |
| 2007/0120100 | A1 | 5/2007 | Glatkowski et al. | |
| 2007/0125418 | A1 | 6/2007 | Suzuki et al. | |
| 2007/0141345 | A1 | 6/2007 | Rinzler et al. | |
| 2007/0152560 | A1 | 7/2007 | Naito et al. | |
| 2007/0153353 | A1 | 7/2007 | Gruner | |
| 2007/0153363 | A1 | 7/2007 | Gruner | |
| 2007/0158642 | A1 | 7/2007 | Gruner | |

FOREIGN PATENT DOCUMENTS

| | | | |
|---|---|---|---|
| JP | 55043126 | | 3/1980 |
| JP | 56153647 | | 11/1981 |
| JP | 57157218 | | 9/1982 |
| JP | 59190829 | | 10/1984 |
| JP | 59213730 | | 12/1984 |
| JP | 02032845 | | 2/1990 |
| JP | 3045985 | | 2/1991 |
| JP | 9147752 | | 6/1997 |
| JP | 10258486 | | 9/1998 |
| JP | 11026984 | | 1/1999 |
| JP | 2000028825 | | 1/2000 |
| JP | 2000174488 | | 6/2000 |
| JP | 2000252681 | | 9/2000 |
| JP | 2002062404 | | 2/2002 |
| JP | 2004165237 | | 6/2004 |
| JP | 2004253796 | | 9/2004 |
| JP | 2005008893 | | 1/2005 |
| JP | 2005084475 | | 3/2005 |
| JP | 2005268688 | | 9/2005 |
| JP | 200577405 | | 10/2005 |
| JP | 2005317888 | | 11/2005 |
| JP | 2006035773 | | 2/2006 |
| JP | 2006127928 | | 5/2006 |
| JP | 2006133528 | | 5/2006 |
| JP | 2006171336 | | 6/2006 |
| JP | 2006173945 | | 6/2006 |
| JP | 2006191009 | | 7/2006 |
| JP | 2006191010 | | 7/2006 |
| JP | 2006191011 | | 7/2006 |
| JP | 2006191012 | | 7/2006 |
| JP | 2006261322 | | 9/2006 |
| JP | 2006285068 | | 10/2006 |
| JP | 2006324203 | | 11/2006 |
| JP | 2007011997 | | 1/2007 |
| WO | 2004069737 | A2 | 8/2004 |
| WO | 2005012171 | A2 | 2/2005 |
| WO | 2005014184 | A1 | 2/2005 |
| WO | 2005028577 | A2 | 3/2005 |
| WO | 2005086982 | A2 | 9/2005 |
| WO | 2005096338 | A1 | 10/2005 |
| WO | 2005110624 | A2 | 11/2005 |
| WO | 2005114324 | A2 | 12/2005 |
| WO | 2005120823 | A2 | 12/2005 |
| WO | 2006030981 | A1 | 3/2006 |
| WO | 2006073420 | A2 | 7/2006 |
| WO | 2006132254 | A1 | 12/2006 |
| WO | 2007002737 | A1 | 1/2007 |
| WO | 2007004758 | A1 | 1/2007 |
| WO | 2007022226 | A2 | 2/2007 |
| WO | 2007024206 | A2 | 3/2007 |
| WO | 2007035838 | A2 | 3/2007 |
| WO | 2007061428 | A2 | 5/2007 |
| WO | 2007064530 | A1 | 6/2007 |
| WO | 2007083771 | | 7/2007 |

OTHER PUBLICATIONS

Donner., S., et al., "Fabrication of Optically transparent Carbon Electrodes by the pyroloysis of Photoresist Films", Analytical Chmeistry vol. 78, No. 8, Apr. 15, 2006, pp. 2816-2822.

Watson, K., et al., "Transparent, Flexible, Conductive carbon nanotube coatings for electrostatic charge mitigation", Polymer, 46 (2005), pp. 2076-2085.

Geng, H., et al, "Fabrication of transparent conducting films of carbon nanotubes using spray method", IMID/IDMC '06 digest pp. 525-528 (2006).

Moon, J.S., et al., "Transparent conductive film based on Carbon Nanotubes and PEDOT composites", Diamond and Related Materials 14 (2005), pp. 1882-1887.

Ago, H., et al., "Composites of Carbon Nanotubes and Conjugated Polymers for Photovoltaic Devices", Adv. Mater. 1999, 11 No. 15, pp. 1281-1285.

Kaempgen, M., et al., “Transparent carbon nanotubes coatings”, Applied Surface Science 252, (2005) pp. 425-429.
Peltola, J., et al, “Carbon Nanotube Tranparent Electrodes for Flexible Displays”, Information Display, Feb. 2007, pp. 20-28.
Wu, Z., et al., “Transparent, conductive carbon nanotube films”, Science 305 pp. 1273-1276 (2004).
Ginley, D. et al., “Transparent Conducting Oxides”, MRS Bulletin, vol. 25, No. 8, pp. 15-21, Aug. 2000.
Lewis, B., et al, “Applications and Processing of Transparent Conducting Oxides”, MRS Bulletin, vol. 25, No. 8, pp. 22-27, Aug. 2000.
Gordon, R., “Criteria for Choosing Transparent Conductors”, MRS Bulletin, vol. 25, No. 8, pp. 52-57, Aug. 2000.
Peng, K. et al., “Morphological selection of electroless metal deposits on silicon in aqueous fluoride solution”, Electrochimica Acta 49 (2004) pp. 2563-2568.
Kaempgen, M., et al., “Characterization of Carbon Nanotubes by optical spectra”, SyntheticMetals 135-136—(2003) pp. 755-756.
Sun, Y., et al., “Uniform Silver Nanowires Synthesis by Reducing AgNO3 with Etthylene Glycol in Presence of Seeds and Poly (vinyl Pyrrolidone)”, Chem Mater. 2002, 14, pp. 4736-4745.
Zhang, M et al., “Strong Transparent Multifunctional Carbon nanotube Sheets”, Science (2005) vol. 309, pp. 1215-1219.
Cao, Q, et al. “Highly Bendable, Transparent Thin Film Transistors that use Carbon Nanotube-based Conductors and semiconductors with elastomeric dielectrics”, Adv Mater. 2006, 18, pp. 304-309.
Bo, X Z, et al., “Pentacene-carbon nanotubes: Semiconducting assemblies for thin-film transistor applications”, Applied Physics Letters 87 (20): pp. 1-3 (2005).
Saran, N., et al., “Fabrication and characterization of thin films of single-walled carbon nanotube bundles on flexible plastic substrates”, Journal of the American Chemical Society 126 (14): pp. 4462-4463 (2004).
Hu, L. et al., “Percolation in transparent and conducting carbon nanotubes networks”, Nano Letters 4 (12): pp. 2513-2517 (2004).
Unalan, H, et al., “Design criteria for transparent single-wall carbon nanotube thin-film transistors”, Nano Letters 6 (4): pp. 677-682 (2006).
Rowell, M., et al., “Organic solar cells with carbon nanotube network electrodes”, Applied Physics Letters 88 (23): pp. 1-3 (2006).
Pasquier, A.et al., “Conducting and transparent single-wall carbon nanotube electrodes for polymer-fullerene solar cells”, Applied Physics Letters 87 (20): pp. 1-3 (2005).
Aguirre, C., et al., “Carbon nanotube sheets as electrodes in organic light-emitting diodes”, Applied Physics Letters 88 (18): pp. 1-3 (2006).
Li, J, et al., “Organic light-emitting diodes having carbon nanotube anodes”, Nano Letters 6 (11): pp. 2472-2477 (2006).
Lee, K, et al., “Single wall carbon nanotubes for p-type ohmic contacts to GaN light-emitting diodes”, Nano Letters 4 (5): pp. 911-914 (2004).
Zhang, D., et al., “Transparent, conductive, and flexible carbon nanotube films and their application in organic light emitting diodes”, Nano Letters 6 (9): pp. 1880-1886 (2006).
Artukovic, E, et al., “Transparent and flexible carbon nanotube transistors”, Nano Letters 5 (4): pp. 757-760 (2005).
Zhou, Y., et al., “p-channel, nchannel thin film transistors and p-n diodes based on single wall carbon nanotube networks”, Nano Letters 4 (10): pp. 2031-2035 (2004).
Snow, E. et al., “High-mobility carbon-nanotube thin-film transistors on a polymeric substrate”, Applied Physics Letters 86 (3): pp. 1-3 (2005).
Snow, E. et al., “Random networks of carbon nanotubes as an electronic material”, Applied Physics Letters 82 (13): pp. 2145-2147 (2003).
Seidel, R. et al., “High-current nanotube transistors”, Nano Letters 4 (5): pp. 831-834 (2004).
Hur, S. et al., “Printed thin-film transistors and complementary logic gates that use polymer-coated single-walled carbon nanotubes networks”, Journal of Applied Physics 98 (11): pp. 1-6 (2005).
Moon, S., et al., ‘Transparent conductive film based on Carbon Nanotubes and PEDOT composites’, Abstract submited to the Nanotube’05 conference, printed from http://www.fy.chalmers.se/conferences/nt05/abstracts/p214.html on Feb. 15, 2006.
Yu, X ; et al., “Active sound transmission control for windows using carbon nantotube based transparent thin films”, printed from URL: www.engineeringvillage2.org.proxy.libraries.rutgers.edu/controller/servlet/Controller on Sep. 12, 2006.
Meitl, M, et al., “Solution casting and transfer printing single-walled carbon nanotube films”, Nano Letters 4 (9): pp. 1643-1647 (2004).
Nanotechnology. “How do carbon nanotubes work: carbon nanotube 101.” Retrieved on Dec. 6, 2007. Retrieved from Internet: <http://www.nanovip.com/node/2077>.
Tao, A, et al., Langmuir-Blodgett Silver Nanowire Monolayers for Molecular Sensing Using Surface-Enhanced Raman Spectroscopy, Nano Letter, vol. 3, No. 9, 2003, pp. 1229-1233.
Using packed silver nanowires as sensitive explosives detector, UC Berkeley News, Sep. 11, 2003, http://berkeley.edu/news/media/releases/2003/09/11_silver.shtml.

* cited by examiner

TRANSPARENT CONDUCTORS AND METHODS FOR FABRICATING TRANSPARENT CONDUCTORS

FIELD OF THE INVENTION

The present invention generally relates to transparent conductors and methods for fabricating transparent conductors. More particularly, the present invention relates to transparent conductors that exhibit enhanced conductance, transparency, and stability and methods for fabricating such transparent conductors.

BACKGROUND OF THE INVENTION

Over the past few years, there has been an explosive growth of interest in research and industrial applications for transparent conductors. A transparent conductor typically includes a transparent substrate upon which is disposed a coating or film that is transparent yet electrically conductive. This unique class of conductors is used, or is considered being used, in a variety of applications, such as solar cells, antistatic films, gas sensors, organic light-emitting diodes, liquid crystal and high definition displays, and electrochromic and smart windows, as well as architectural coatings.

Conventional methods of forming transparent conductive coatings on transparent substrates include dry and wet processes. In dry processes, plasma vapor deposition (PVD) (including sputtering, ion plating and vacuum deposition) or chemical vapor deposition (CVD) is used to form a conductive transparent film of a metal oxide, such as indium-tin mixed oxide (ITO), antimony-tin mixed oxide (ATO), fluorine-doped tin oxide (FTO), and aluminum-doped zinc oxide (Al—ZO). The films produced using dry processes have both good transparency and good conductivity. However, these films, particularly ITO, are expensive and require complicated apparatuses that result in poor productivity. Other problems with dry processes include difficult application results when trying to apply these materials to continuous and/or large substrates. In conventional wet processes, conductive coatings are formed using the above-identified electrically conductive powders mixed with liquid additives. In all of these conventional methods using metal oxides and mixed oxides, the materials suffer from supply restriction, lack of spectral uniformity, poor adhesion to substrates, and brittleness.

Accordingly, it is desirable to provide cost-efficient transparent conductors with enhanced transparency, conductivity, and stability, and that demonstrate improved adhesion between the substrates and coatings that comprise the conductors. It also is desirable to provide methods for fabricating such transparent conductors that do not require expensive or complicated systems. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In accordance with an exemplary embodiment of the present invention, a transparent conductor is provided. The transparent conductor comprises a substrate having a surface and a transparent conductive coating disposed on the surface of the substrate. The transparent conductive coating has a plurality of conductive components of at least one type and an aliphatic isocyanate-based polyurethane component.

In accordance with an exemplary embodiment of the present invention, a method for fabricating a transparent conductor is provided. The method comprises the steps of providing a substrate having a surface, mixing a binder comprising an aliphatic isocyanate-based polyurethane component and a first solvent to form a binder precursor, and applying the binder precursor to the surface of the substrate. The first solvent is at least partially evaporated from the binder precursor such that the binder remains on the surface of the substrate. A dispersion comprising a plurality of conductive components of at least one type and a second solvent is formed and is applied to the binder. The second solvent is at least partially evaporated from the dispersion and a transparent conductive coating is formed on the surface of the substrate.

In accordance with another exemplary embodiment of the present invention, a method for fabricating a transparent conductor is provided. The method comprises providing a substrate having a surface and forming a dispersion comprising a plurality of conductive components of at least one type and a solvent. The dispersion is applied to the surface of the substrate and the solvent is allowed to soften the substrate so that at least a portion of the plurality of conductive components becomes at least partially embedded in the substrate. The solvent is evaporated from the dispersion.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Transparent conductors described herein are formed using discrete conductive components that can be readily and cost-efficiently manufactured. In addition to being cost-efficient, the transparent conductors exhibit improved transparency, conductance, and light and mechanical stability due to the use of binders comprised of aliphatic isocyanate-based polyurethane components. While polyurethanes have been suggested for use in fabricating transparent conductors, the inventors have found that certain polyurethanes, such as aromatic polyurethanes, result in transparent conductive coatings that exhibit poor transparency, light stability, mechanical stability, and/or adherence to underlying transparent substrates. In contrast, the inventors have discovered that transparent conductive coatings that use binders comprising aliphatic isocyanate-based polyurethane components result in transparent conductive coatings that exhibit superior transparency and conductivity, are light stable, can maintain flexibility on flexible substrates, and demonstrate strong adhesion to underlying transparent substrates.

Figure 1:
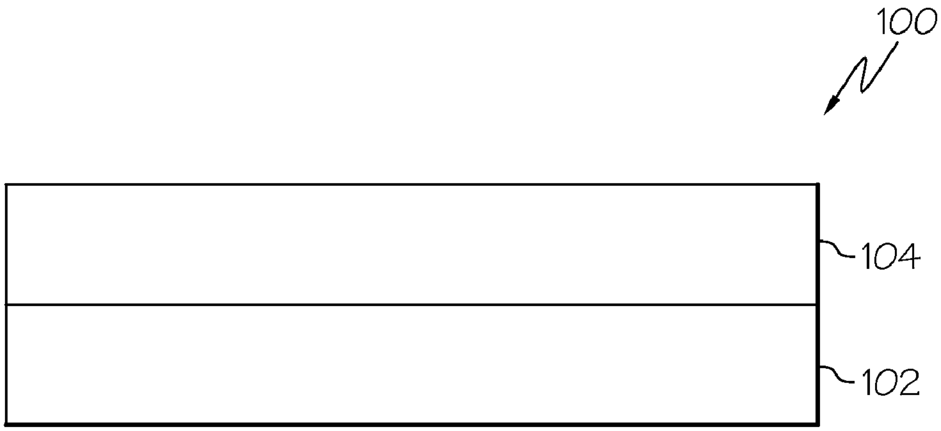
FIG. 1 is a cross-sectional view of a transparent conductor in accordance with an exemplary embodiment of the present invention.

A transparent conductor 100 in accordance with an exemplary embodiment of the present invention is illustrated in FIG. 1. The transparent conductor 100 comprises a transparent substrate 102. A transparent conductive coating 104 is disposed on the transparent substrate 102. The transparency of a transparent conductor can be characterized by its light transmittance (defined by ASTM D1003), that is, the percentage of incident light transmitted through the conductor and its surface resistivity. Electrical conductivity and electrical resistivity are inverse quantities. Very low electrical conductivity corresponds to very high electrical resistivity. No electrical conductivity refers to electrical resistivity that is above the limits of the measurement equipment available. In one exemplary embodiment of the invention, the transparent conductor 100 has a total light transmittance of no less than about 50%. In another exemplary embodiment of the invention, the transparent conductor 100 has a surface resistivity in the range of about $10^1$ to about $10^{12}$ ohms/square (Ω/sq). In another exemplary embodiment of the invention, the transparent conductor 100 has a surface resistivity in the range of about $10^1$ to about $10^3$ Ω/sq. In this regard, the transparent conductor 100 may be used in various applications such as flat panel displays, touch panels, thermal control films, microelectronics, photovoltaics, flexible display electronics, and the like.

Figure 2:
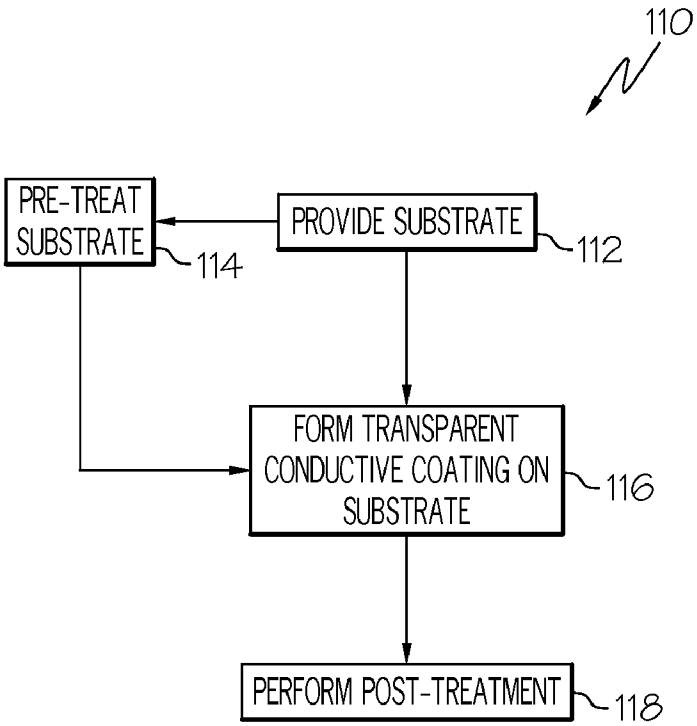
FIG. 2 is a flowchart of a method for fabricating a transparent conductor in accordance with an exemplary embodiment of the present invention.

Referring to FIG. 2, a method 110 for fabricating a transparent conductor, such as the transparent conductor 100 of FIG. 1, comprises an initial step of providing a transparent substrate (step 112). The term "substrate," as used herein, includes any suitable surface upon which the compounds and/or compositions described herein are applied and/or formed. The transparent substrate may comprise any rigid or flexible transparent material. In one exemplary embodiment of the invention, the transparent substrate has a total light transmittance of no less than about 85%. The light transmittance of the transparent substrate 102 can be less than, equal to, or greater than the light transmittance of the transparent conductive coating 104. Examples of transparent materials suitable for use as a transparent substrate include glass, ceramic, metal, paper, polycarbonates, acrylics, silicon and compositions containing silicon such as crystalline silicon, polycrystalline silicon, amorphous silicon, epitaxial silicon, silicon dioxide ($SiO_2$), silicon nitride and the like, other semiconductor materials and combinations, indium tin oxide (ITO) glass, ITO-coated plastics, polymers including homopolymers, copolymers, grafted polymers, polymer blends, polymer alloys and combinations thereof, composite materials, or multi-layer structures thereof. Examples of suitable transparent polymers include polyesters such as polyethylene terephthalate (PET) and polyethylene naphthalate (PEN), polyolefins, particularly the metallocened polyolefins, such as polypropylene (PP) and high-density polyethylene (HDPE) and low-density polyethylene (LDPE), polyvinyls such as plasticized polyvinyl chloride (PVC), polyvinylidene chloride, cellulose ester bases such as triacetate cellulose (TAC) and acetate cellulose, polycarbonates, poly(vinyl acetate) and its derivatives such as poly(vinyl alcohol), acrylic and acrylate polymers such as methacrylate polymers, poly(methyl methacrylate) (PMMA), methacrylate copolymers, polyamides and polyimides, polyacetals, phenolic resins, aminoplastics such as urea-formaldehyde resins, and melamine-formaldehyde resins, epoxide resins, urethanes and polyisocyanurates, furan resins, silicones, casesin resins, cyclic thermoplastics such as cyclic olefin polymers, styrenic polymers, fluorine-containing polymers, polyethersulfone, and polyimides containing an alicyclic structure.

In an optional embodiment of the present invention, the substrate can be pretreated to facilitate the deposition of components of the transparent conductive coating, discussed in more detail below, and/or to facilitate adhesion of the components to the substrate (step 114). The pretreatment may comprise a solvent or chemical washing, heating, or surface treatments such as plasma treatment, UV-ozone treatment, or flame or corona discharge. Alternatively, or in combination, an adhesive (also called a primer or binder) may be deposited onto the surface of the substrate to further improve adhesion of the components to the substrate. Method 110 continues with the formation of a transparent conductive coating, such as transparent conductive coating 104 of FIG. 1, on the substrate (step 116).

Figure 3:
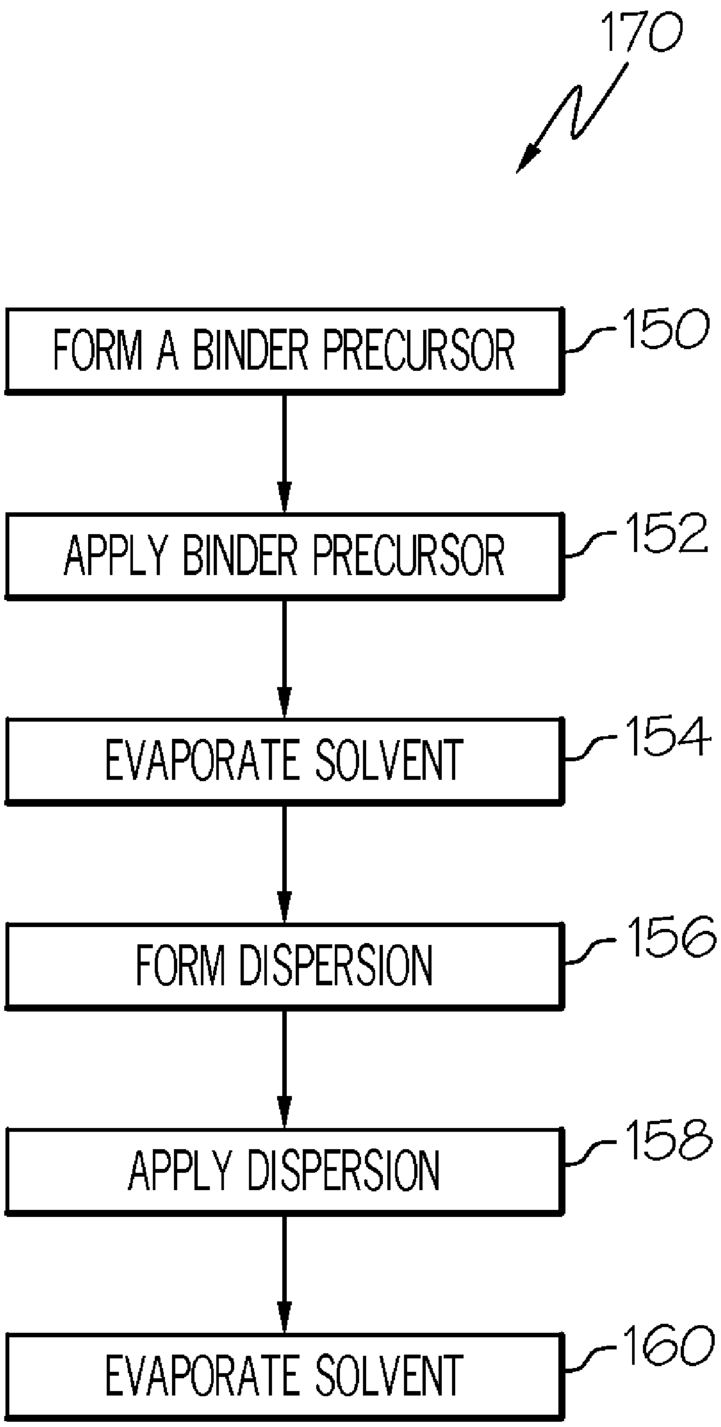
FIG. 3 is a flowchart of a method for fabricating a transparent conductive coating as used in the method of FIG. 2, in accordance with an exemplary embodiment of the present invention.

Referring to FIG. 3, in accordance with another exemplary embodiment of the present invention, the step of forming a transparent conductive coating on a substrate (step 116 of FIG. 2) comprises a process 170 for forming a transparent conductive coating on the substrate where the transparent conductive coating exhibits improved adhesion to the substrate. Process 170 may begin with the formation of a binder precursor comprising a binder and a solvent (step 150). In one exemplary embodiment of the invention, the binder comprises an aliphatic isocyanate-based polyurethane component. Polyurethane is a polymer produced by the condensation reaction of an isocyanate and a hydroxyl-containing material (i.e., a polyol or a polyol blend comprising a polyol and a polyamine). While polyurethanes have been suggested for use in fabricating transparent conductors, various polyurethanes are not suitable for the task because they are not light stable. For example, aromatic polyurethanes, such as toluene diisocyanate (TDI)-containing polyurethanes and methylene diisocyanate (MDI)-containing polyurethanes result in yellowing of the subsequently-formed transparent conductive coating. Other aromatic polyurethanes, such as highly-crossed toluene diisocyanate- and methylene diphenyl diisocyanate-based polyurethanes, polyureas, and the like, are too brittle for fabricating transparent conductors. However, the inventors have found that aliphatic isocyanate-based polyurethanes are light stable and do not cause yellowing of a subsequently-formed transparent conductive coatings. Examples of isocyanates useful for fabricating aliphatic isocyanate-based polyurethanes include hexamethylene diisocyanate (HDI), isophorone diisocyanate (IPDI), 2,2,4- and 2,4,4-trimethyl-hexamethylene diisocyanate (TMDI), and isocyanatoethyl methacrylate (IEM). Polyols suitable for synthesizing the polyurethanes include acrylic polyols and polyester polyols. Examples of aliphatic isocyanate-based polyurethanes suitable as binders in the exemplary embodiments of the present invention include Stahl SU4924 and SU2648 polyurethanes, available from Stahl USA of Peabody, Mass.

In another exemplary embodiment of the present invention, the aliphatic isocyanate-based polyurethane component is an aliphatic isocyanate-based polyurethane with no more than 50% crosslinking. Polyurethanes formed from highly-aromatic isocyanates and/or polyols and polyurethanes with a high degree of crosslinking produce highly friable transparent conductive coatings that will crack when subjected to mechanical strain. Accordingly, such transparent conductive coatings are not suitable for fabricating flexible transparent conductors, such as those used for touch panel displays. However, the inventors have found that aliphatic isocyanate-based polyurethanes with no more than 50% crosslinking produce transparent conductive coatings that exhibit a high degree of flexibility and adherence to underlying flexible substrates.

In yet another exemplary embodiment of the invention, the aliphatic isocyanate-based polyurethane component is an aliphatic isocyanate-based polyurethane with a starting oligomer having a molecular weight of at least 2500. The oligomer is a low molecular weight polyurethane that consists of two, three, or four urethane units, with and without functional groups such as NCO groups that are capable of further reactions such as crosslinking reactions. Polyurethanes with a molecular weight below 2500 demonstrate poor resistance to surface scratching. However, aliphatic isocyanate-based polyurethanes with molecular weights of at least 2500 produce transparent conductive coatings that demonstrate excellent light stability, adherence to an underlying substrate, and high surface scratch resistance.

In another exemplary embodiment of the present invention, the aliphatic isocyanate-based polyurethane component is a linear block copolymer of alternating hard and soft segments. The physical properties of this segmented polyurethane component are usually attributed to its microphase-separated structure resulting from the incompatibility of the soft and hard segments. The performance characteristics of the polyurethane component is influenced by such variables as segment size, hard segment content, hard segment chemistry, soft segment chemistry, degree of microphase separation, and the like. For example, MDI-polyether-based polyurethane comprises hard segments of 4-4'-MDI with methylpropanediol as a chain extender and soft segments of polyetherpolyol.

In a further exemplary embodiment of the present invention, the aliphatic isocyanate-based polyurethane component is a water-borne or water-soluble copolymer of aliphatic polyurethane that permits the polyurethane coating to be applied to a solvent-sensitive substrate. Many substrate materials can be attacked, that is, their transparency, conductivity, stability, or the like can be compromised, by various solvents. For example, polycarbonate flexible films are very prone to crazing by toluene and toluene-containing solvents. In addition, polycarbonate films can be easily crazed by ketones, such as methyl ethyl ketone. Thus, for such substrates, water-borne or water-soluble copolymers of polyurethane, such as acrylic polyurethanes, may be more suitable for use in the binder precursor of the embodiments of the present invention. Water-borne polyurethanes are formulated by incorporating ionic groups into the polymer backbone. These ionomers are dispersed in water through neutralization. Cationomers can be formed from IPDI, N-ethyldiethanolamine, and poly(tetramethylene adipate diol). Anionic dispersions are obtained from IPDI, PTMG (poly(tetramethylene ether glycol)), PPG (polypropylene glycol), and dimethylol propionic acid. The ionic groups also can be introduced in the polyol segment. For example, a reaction of diesterdiol, obtained from maleic anhydride and 1,4-butanediol, with sodium bisulfite produces the ionic polyurethane building block, which on reaction with HDI produces a water-borne aliphatic isocyanate-based polyurethane ionomer. In addition to acrylic polyurethanes, other water-borne or water-soluble copolymers of aliphatic polyurethane suitable for use include acrylamide polymers, cellulose, gums, polysaccharide, proteins, polyelectrolytes, polynucleotides, and protein.

In a further exemplary embodiment, the binder may be selected based on its ability to bond with the surface of the substrate. Such bonding includes physical and chemical bonding. Physical bonding includes polarity effects from, for example, Van der Waal forces, hydrogen bonding, polarity attraction, electron attraction, and the like, and physical locking. Thus, for substrates having a substantially polar molecular surface, aliphatic isocyanate-based polyurethanes with polar molecular structures will exhibit strong adhesion with the substrate. The polarity of a polyurethane is dependent on the isocyanates and polyols used in the condensation reaction producing the polyurethane. For example, long aliphatic polyols result in polyurethanes with low polarity. Such polyurethanes, therefore, will demonstrate poor adhesion to a polar substrate. Accordingly, the higher the polarity of the polyurethane, the better it will adhere to a substrate having a polar molecular surface.

Physical bonding may also be the result of physical locking between the polyurethane and the substrate. Certain substrates, such as polyethylene terephthalate (PET), are semicrystalline and have amorphous and crystalline regions. Highly aromatic polyurethanes have a highly ordered structure and, therefore, will poorly adhere to the amorphous regions of the PET substrate. In contrast, aliphatic polyurethanes have an amorphous structure that can align with the amorphous regions of a PET substrate and demonstrate stronger adhesion to the substrate. Thus, polyurethanes that exhibit the ability to morphologically interlock with a substrate surface will demonstrate strong adhesion to the substrate.

In another exemplary embodiment of the present invention, the binder can be selected based on its ability to chemically bond to an underlying substrate. Chemical bonding between an aliphatic isocyanate-based polyurethane and a substrate is due to the chemical linkages between functional groups of molecules at the surface of the substrate and functional groups on the polyurethane molecule. As used herein, the term "functional group" means that part of a molecule that effectively determines the molecule's chemical properties. Polyurethanes with functional end groups can be synthesized using mono-amines and/or mono-alcohols at the final stage of the urethane polymerization. Further, the surface molecules of a substrate can be made to have functional end groups by such well known treatments as plasma treatment.

In one exemplary embodiment of the present invention, for example, when at least a substantial portion of molecules at the surface of the substrate terminate in polar functional groups, such as alcohol (—OH) functional groups, the binder can comprise an isocyanate (—NCO)-terminated polyurethane. As noted above, polyurethane is synthesized by condensation reactions of isocyanates and polyols. The reaction can be substantially completely stoichiometric, in which case the polyurethane has one (—NCO) functional group and one (—OH) functional group, or it can utilize excessive isocyanate or alcohol. If the condensation reaction uses excessive isocyanate, polyurethane molecules terminating in more than one (—NCO) functional group can be synthesized. These isocyanate functional groups can form chemical linkages with polar functional groups. Accordingly, if excess polar functional groups (such as —OH groups) are available on the molecular surface of a substrate, adhesion between the isocyanate-terminated polyurethane and the substrate is greatly enhanced.

Similarly, isocyanate functional groups can form chemical linkages with acid (—COOH) functional groups. Accordingly, if excess (—COOH) functional groups are available on the molecular surface of a substrate, adhesion between the isocyanate-terminated polyurethane and the substrate also is greatly enhanced.

In another exemplary embodiment of the present invention, for example, when at least a substantial portion of molecules at the surface of the substrate terminate in (—COOH) functional groups, the binder can comprise (—OH)-terminated polyurethane. An (—OH)-terminated polyurethane can be synthesized using excess alcohol in the polymerization reaction. These (—OH) functional groups then can form ester chemical linkages with (—COOH) functional groups. Accordingly, if excess (—COOH) functional groups are available on the molecular surface of a substrate, strong adhesion between the (—OH)-terminated polyurethane and the substrate will result.

In a further exemplary embodiment of the present invention, for example, when at least a substantial portion of molecules at the surface of the substrate terminate in (—COOH) functional groups, the binder can comprise amine (—$NH_2$)-terminated polyurethane. Often during polyurethane synthesis, for example, to minimize cross-linking during storage, diamines are added during the final reaction to ensure that the resulting polyurethane is free of isocyanates, consequently resulting in the synthesis of amine-terminated polyurethanes molecules. These amine functional groups can form amide chemical linkages with (—COOH) functional groups. Accordingly, if excess (—COOH) functional groups are available on the molecular surface of a substrate, adhesion between the amine-terminated polyurethane and the substrate also is greatly enhanced.

As noted above, the binder precursor of step 150 further comprises a solvent. Solvents suitable for use in the binder precursor comprise any suitable pure fluid or mixture of fluids that is capable of forming a true solution, an emulsion, or a colloidal solution with the binder and that can be volatilized at a desired temperature, such as the critical temperature, or that can facilitate any of the above-mentioned design goals or needs. The solvent may be included in the binder precursor to lower the binder's viscosity and promote uniform coating onto the substrate by art-standard methods.

Contemplated solvents include any single or mixture of organic, organometallic, or inorganic molecules that are easily removed within the context of the applications disclosed herein. For example, contemplated solvents comprise relatively low boiling points as compared to the boiling points of precursor components. In some embodiments, contemplated solvents have a boiling point of less than about 250° C. In other embodiments, contemplated solvents have a boiling point in the range of from about 50° C. to about 250° C. to allow the solvent to evaporate from the applied film and leave the binder in place.

In one exemplary embodiment of the invention, the binder and solvent form a homogeneous binder precursor that is phase stable. Some polyurethane/solvent combinations are not stable and phase separate during processing, causing significant hazing and optical defects in the subsequently-formed transparent conductive coating. For example, while Stahl SU 4924 polyurethane is soluble in a solvent blend of isopropyl alcohol (IPA) and toluene, phase separation occurs when the solvent blend is an IPA-rich mixture of IPA and toluene. However, for example, when an aliphatic isocyanate-based polyurethane such as Stahl SU 4924 is mixed with an IPA/toluene blend having an IPA/toluene ratio of the azeotrope or less (58:42 or less), a phase-stable, optically superior transparent conductive coating results.

The binder and solvent are mixed using any suitable mixing or stirring process. For example, a low speed sonicator or a high shear mixing apparatus, such as a homogenizer, a microfluidizer, a cowls blade high shear mixer, an automated media mill, or a ball mill, may be used for several seconds to an hour or more to form the binder precursor. Heat also may be used to facilitate formation of the precursor, although the heat should be performed at a temperature below the vaporization temperature of the solvent. In addition to the binder and the solvent, the binder precursor may comprise one or more functional additives. As described above, examples of such additives include dispersants, surfactants, polymerization inhibitors, corrosion inhibitors, light stabilizers, wetting agents, adhesion promoters, antifoaming agents, detergents, thickeners, rheology modifiers, viscosity modifiers, flame retardants, pigments, plasticizers, and photosensitive and/or photoimageable materials.

The method 170 continues by applying the binder precursor to the substrate to a desired thickness (step 152). The binder precursor may be applied by, for example, brushing, painting, screen printing, stamp rolling, rod or bar coating, or spraying the binder onto the substrate, dip-coating the substrate into the binder, rolling the binder onto substrate, or by any other method or combination of methods that permits the binder to be applied uniformly or at least substantially uniformly to the surface of the substrate.

The solvent of the binder precursor then is at least partially evaporated such that the binder has a sufficiently high viscosity so that it is no longer mobile on the substrate and does not move either under its own weight when subjected to gravity or under the influence of surface energy minimizing forces within the coating (step 154). In one exemplary embodiment, the binder precursor may be applied by a conventional rod coating technique and the substrate can be placed in an oven to heat the substrate and binder precursor and thus evaporate the solvent. In another example, the solvent can be evaporated at room temperature (15° C. to 27° C.). In another example, the binder precursor may be applied to a heated substrate by airbrushing the precursor onto the substrate at a coating speed that allows for the evaporation of the solvent.

The method further comprises the step of forming a dispersion (step 156). In one exemplary embodiment, the dispersion comprises at least one solvent and a plurality of conductive components of at least one type. In one exemplary embodiment, the solvent is one in which the conductive components can form a true solution, a colloidal solution, or an emulsion. In another exemplary embodiment, the solvent is the same solvent used in the binder precursor, as described above with respect to step 152.

The conductive components are discrete structures that are capable of conducting electrons. Examples of the types of such conductive structures include conductive nanotubes, conductive nanowires, and any conductive nanoparticles, including metal and metal oxide nanoparticles, and conducting polymers and composites. These conductive components may comprise metal, metal oxide, polymers, alloys, composites, carbon, or combinations thereof, as long as the component is sufficiently conductive. One example of a conductive component is a discrete conductive structure, such as a metal nanowire, which comprises one or a combination of transition metals, such as silver (Ag), nickel (Ni), tantalum (Ta), or titanium (Ti). Other types of conductive components include multi-walled or single-walled conductive nanotubes and non-functionalized nanotubes and functionalized nanotubes, such as acid-functionalized nanotubes. These nanotubes may comprise carbon, metal, metal oxide, conducting polymers, or a combination thereof. Additionally, it is contemplated that the conductive components may be selected and included based on a particular diameter, shape, aspect ratio, or combination thereof. As used herein, the phrase "aspect ratio" designates that ratio which characterizes the average particle size or length divided by the average particle thickness or diameter. In one embodiment, conductive components contemplated herein have a high aspect ratio, such as at least 100:1. A 100:1 aspect ratio may be calculated, for example, by utilizing components that are 6 microns (μm) by 60 nm. In another embodiment, the aspect ratio is at least 300:1.

To form the dispersion, the conductive components and the solvent are combined to form a homogeneous mixture. In one exemplary embodiment of the present invention, the conductive components are AgNWs having an average diameter in the range of about 40 to about 100 nm. In another exemplary embodiment, the conductive components are AgNWs having an average length in the range of about 1 μm to about 20 μm. In yet another embodiment, the conductive components are AgNWs having an aspect ratio of about 100:1 to greater than about 1000:1. In one exemplary embodiment of the invention, the conductive components comprise from about 0.01% to about 4% by weight of the total dispersion. In a preferred embodiment of the invention, the conductive components comprise from about 0.1% to about 0.6% by weight of the dispersion. The dispersion may be formed using any suitable mixing or stirring process. For example, a low speed sonicator or a high shear mixing apparatus, such as a homogenizer, a microfluidizer, a cowls blade high shear mixer, an automated media mill, or a ball mill, may be used for several seconds to an hour or more, depending on the intensity of the mixing, to form the dispersion. The mixing or stirring process should result in a homogeneous mixture without damage or change in the physical and/or chemical integrity of the conductive components. For example, the mixing or stirring process should not result in slicing, bending, twisting, coiling, or other manipulation of the conductive components that would reduce the conductivity of the resulting transparent conductive coating. Heat also may be used to facilitate formation of the dispersion, although the heat should be performed at a temperature below the vaporization temperature of the solvent. In addition to the conductive components and the solvent, the dispersion may comprise one or more functional additives. As described above, examples of such additives include dispersants, surfactants, polymerization inhibitors, corrosion inhibitors, light stabilizers, wetting agents, adhesion promoters, antifoaming agents, detergents, thickeners, viscosity modifiers, rheology modifiers, flame retardants, pigments, plasticizers, and photosensitive and/or photoimageable materials, such as those described above. While FIG. 3 illustrates that the step of forming the dispersion (step 156) is performed after the steps of forming and applying the binder precursor (steps 152 and 154), it will be understood that the dispersion can be formed before or during either or both steps 152 and 154.

After the solvent of the binder precursor is at least partially evaporated, the dispersion is applied to the remaining binder to a desirable thickness (step 158). The dispersion may be applied by, for example, brushing, painting, screen printing, stamp rolling, rod or bar coating, or spraying the dispersion onto the binder, dip-coating the binder into the dispersion, rolling the dispersion onto the binder, or by any other method or combination of methods that permits the dispersion to be applied uniformly or substantially uniformly to the binder. Because the dispersion includes a solvent in which the binder is highly soluble, the binder dissolves and/or at least partially softens upon contact with the solvent. Accordingly, the conductive components of the dispersion can become at least partially embedded within the binder. For example, application of a toluene and silver nanowire dispersion on a polycarbonate substrate results in a softening of the polycarbonate. Softening of the polycarbonate in turn results in an embedding of a least a portion of the silver nanowires into the polycarbonate substrate. Embedding of the conductive components within the binder substantially enhances the mechanical stability of the transparent conductive coating subsequently formed on the substrate.

The solvent of the dispersion then is at least partially evaporated (step 160) so that the binder solidifies or otherwise hardens. For example, in one exemplary embodiment, the dispersion may be applied by a conventional rod coating technique and the substrate can be placed in an oven to heat the substrate and dispersion and thus evaporate the solvent. In another example, the solvent can be evaporated at room temperature (15° C. to 27° C.). In another example, the dispersion may be applied to a heated substrate by airbrushing the dispersion onto the substrate at a coating speed that allows for the evaporation of the solvent.

Figure 4:
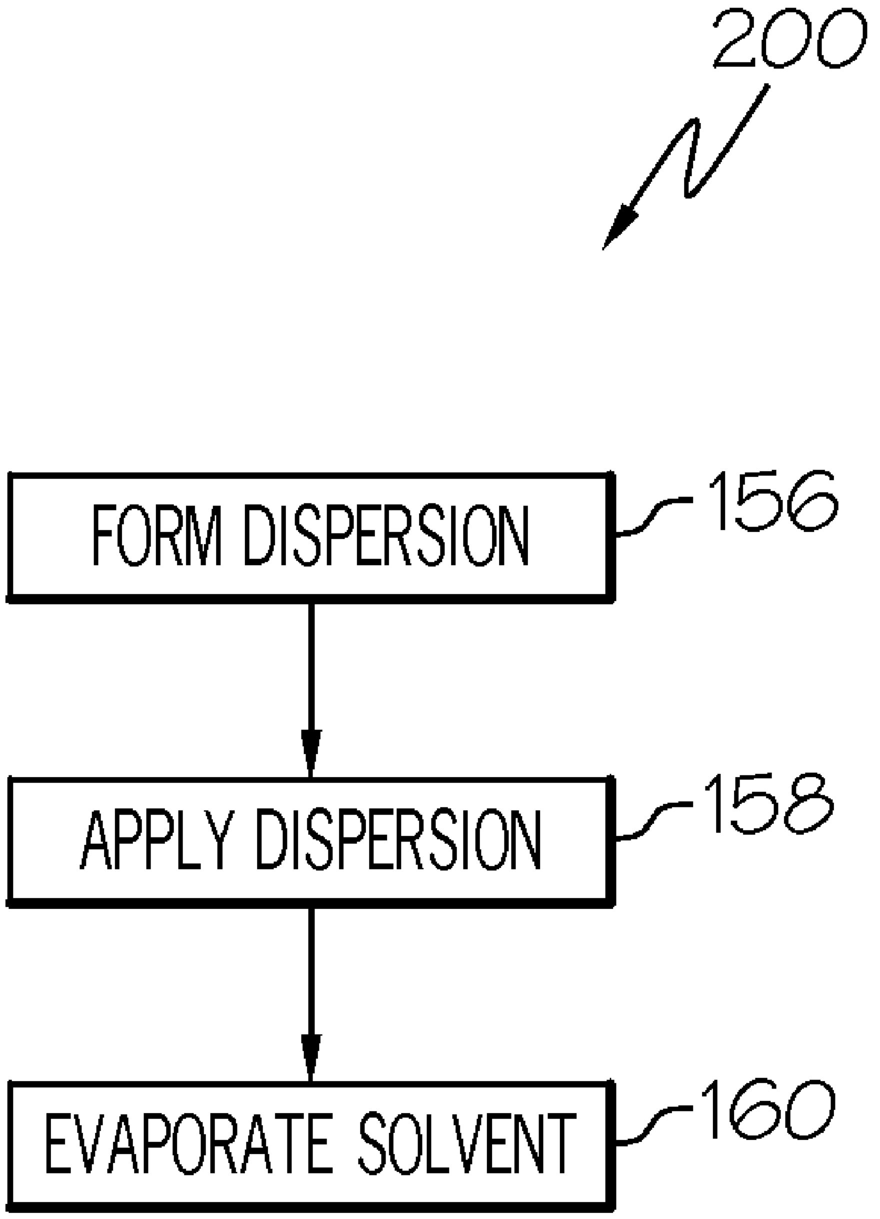
FIG. 4 is a flowchart of a method for fabricating a transparent conductive coating as used in the method of FIG. 2, in accordance with another exemplary embodiment of the present invention.

In an alternative embodiment of the present invention in which a binder precursor is not utilized, such as in alternative method 200 of FIG. 4, a solvent that at least partially dissolves or otherwise softens the substrate may be used in the dispersion. In this regard, the dispersion can be applied to the substrate, which in turn is at least partially dissolved or softened upon contact with the solvent of the dispersions. Accordingly, the conductive components of the dispersion can become at least partially embedded within the substrate, thus enhancing the mechanical stability of the resulting transparent conductive coating.

Referring back to FIG. 2, after at least partial evaporation of the solvent from the dispersion, the resulting transparent conductive coating can be subjected to a combination of post-treatments to improve the transparency and/or conductivity of the coating (step 118). In one exemplary embodiment, the transparent conductive coating can be subjected to a combination of post-treatments in which one of the post-treatments includes treatment with an alkaline, including treatment with a strong base. Contemplated strong bases include hydroxide constituents, such as sodium hydroxide (NaOH). Other hydroxides which may be useful include lithium hydroxide (LiOH), potassium hydroxide (KOH), ammonium hydroxide ($NH_3OH$), calcium hydroxide (CaOH), or magnesium hydroxide (MgOH). Alkaline treatment can be at pH greater than 7, more specifically at pH greater than 12. Without wishing to be bound by theory, one reason this post-treatment may improve the transparency and/or conductivity of the resulting transparent conductive coating may be that a small but useful amount of oxide is formed on the surface of the conductive components, which beneficially modifies the optical properties and conductivity of the conductive components network by forming an oxide film of favorable thickness on top of the conductive components. Another explanation for the improved performance may be that contact between the conductive components is improved as a result of the treatment, and thereby the overall conductivity of the components network is improved. Oxide scale formation may result in an overall expansion of the dimensions of the conductive components and, if the conductive components are otherwise held in a fixed position, may result in a greater components-to-components contact. Another mechanism by which the conductivity could improve is via the removal of any residual coating or surface functional groups that were formed or placed on the conductive components during either synthesis of the conductive components or during formation of the conductive coating. For example, the alkaline treatment may remove or reposition micelles or surfactant coatings that are used to allow a stable conductive components dispersion as an intermediate process in forming the conductive coatings. The alkaline may be applied by, for example, brushing, painting, screen printing, stamp rolling, bar or rod coating, inkjet printing, or spraying the alkaline onto the transparent conductive coating, dip-coating the coating into the alkaline, rolling the alkaline onto coating, or by any other method or combination of methods that permits the alkaline to be applied substantially uniformly to the transparent conductive coating. In another exemplary embodiment of the invention, it will be understood that the alkaline can be added to the dispersion or to the binder precursor before application to the substrate.

Other finishing steps for improving the transparency and/or conductivity of the transparent conductive coating include oxygen plasma exposure, pressure treatment, thermal treatment, and corona discharge exposure. For example, suitable plasma treatment conditions are about 250 mTorr of $O_2$ at 100 to 250 watts for about 30 seconds to 20 minutes in a commercial plasma generator. Suitable pressure treatment includes passing the transparent conductive coating through a nip roller so that the conductive components are pressed closely together, forming a network that results in an increase in the conductivity of the resulting transparent conductor. A combination of such treatments will greatly improve the transparency and conductivity of the resulting transparent conductive coating compared to just one of the above-described treatments of the coating.

Accordingly, cost-efficient transparent conductors that exhibit good transparency, good conductivity, and stability and methods for fabricating such transparent conductors have been provided. The conductors are formed using binder precursors that utilize aliphatic isocyanate-based polyurethane components that result in transparent conductive coatings that are light stable, maintain flexibility when disposed on flexible substrates, and demonstrate superior adhesion to underlying substrates. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A transparent conductor comprising:

a substrate having a surface;

a transparent conductive coating disposed on the surface of the substrate, the transparent conductive coating having a plurality of conductive components of at least one type at least partially embedded in a binder having an aliphatic isocyanate-based polyurethane component, wherein the conductive components comprise components selected from the group consisting of nanotubes, nanowires, and a combination thereof.

2. The transparent conductor of claim 1, wherein the aliphatic isocyanate-based polyurethane component is an aliphatic isocyanate-based polyurethane having no more than 50% crosslinking.

3. The transparent conductor of claim 1, wherein the aliphatic isocyanate-based polyurethane component is an aliphatic isocyanate-based polyurethane formed from an oligomer with a molecular weight of at least 2500.

4. The transparent conductor of claim 1, wherein the aliphatic isocyanate-based polyurethane component is physically or chemically bonded to the surface of the substrate.

5. The transparent conductor of claim 4, wherein the aliphatic isocyanate-based polyurethane component is a polar aliphatic isocyanate-based polyurethane and the substrate has a substantially polar molecular surface.

6. The transparent conductor of claim 4, wherein at least a substantial portion of molecules at the surface of the substrate comprises alcohol (—OH)-terminated molecules and the aliphatic isocyanate-based polyurethane component comprises an isocyanate (—NCO)-terminated polyurethane.

7. The transparent conductor of claim 4, wherein at least a substantial portion of molecules at the surface of the substrate comprises acid (—COOH)-terminated molecules and the aliphatic isocyanate-based polyurethane component comprises an isocyanate (—NCO)-terminated polyurethane.

8. The transparent conductor of claim 4, wherein at least a substantial portion of molecules at the surface of the substrate comprises acid (—COOH)-terminated molecules and the aliphatic isocyanate-based polyurethane component comprises an alcohol (—OH)-terminated polyurethane.

9. The transparent conductor of claim 4, wherein at least a substantial portion of molecules at the surface of the substrate comprises acid (—COOH)-terminated molecules and the aliphatic isocyanate-based polyurethane component comprises an amine (—$NH_2$)-terminated polyurethane.

10. The transparent conductor of claim 1, wherein the aliphatic isocyanate-based polyurethane component is a segmented polyurethane comprising hard and soft segments.

11. The transparent conductor of claim 1, wherein the transparent conductor has a total light transmittance of no less than about 50% and a surface resistivity it the range of about $10^1$ to about $10^{12}$ Ω/sq.

* * * * *